United States Patent [19]

Meunier

[11] 4,387,582
[45] Jun. 14, 1983

[54] KEY OPERATED LOCK FOR SECURING A MOVABLE PORTION OF A MOTOR VEHICLE

[75] Inventor: Pierre Meunier, Plaisir, France

[73] Assignee: Sodex-Magister, Croissy, France

[21] Appl. No.: 201,101

[22] Filed: Oct. 28, 1980

[30] Foreign Application Priority Data

Jan. 14, 1980 [FR] France .................................. 80 00683

[51] Int. Cl.³ ............................................ E05B 65/12
[52] U.S. Cl. ...................................... 70/186; 70/252; 70/370
[58] Field of Search ......................... 292/140, 170, 182; 70/186, 252, 371, 370, 369, 368, 185, 184, 209, 216, 236, 247, 248

[56] References Cited

U.S. PATENT DOCUMENTS

| Re. 15,587 | 5/1923 | Pagelsen | 70/209 |
|---|---|---|---|
| 1,818,997 | 8/1931 | Martel | 70/247 |
| 1,861,713 | 6/1932 | Norviel | 70/248 |
| 2,053,335 | 9/1936 | Jacobi | 70/370 |
| 2,517,378 | 8/1950 | Aspenwall et al. | 292/170 |
| 3,792,884 | 2/1974 | Tutikawa | 292/182 X |
| 3,828,592 | 8/1974 | Horgan, Jr. | 292/170 X |
| 3,870,353 | 3/1975 | Miller | 292/140 X |
| 3,919,867 | 11/1975 | Lipschutz et al. | 70/252 X |
| 3,985,009 | 10/1976 | Lipschutz | 70/252 |

FOREIGN PATENT DOCUMENTS

| 1240060 | 7/1960 | France | 70/185 |
|---|---|---|---|
| 482608 | 7/1953 | Italy | 70/216 |
| 20289 | of 1898 | United Kingdom | 70/236 |

*Primary Examiner*—Ramon S. Britts
*Assistant Examiner*—Carl F. Pietruszka
*Attorney, Agent, or Firm*—James Creighton Wray

[57] ABSTRACT

An anti-theft device for a motor vehicle comprises a locking bolt movable into a locking position to secure a steering column, and a cylinder lock actuated driving plate movable in a direction transverse to the direction of movement of the locking bolt. The driving plate is provided with an inclined slot which drivably engages a pin attached to the locking bolt. The end of the slot is provided with a cut-out portion forming a surface against which the pin engages if the locking bolt is moved in an unauthorized manner. Furthermore, the surface of the cut-away portion is so shaped that the driving plate is urged to remain in its locking position. For authorized unlocking, movement of the driving plate by means of the cylinder lock opposite to its locking position causes the slot to drive the locking bolt into an unlocked position.

2 Claims, 5 Drawing Figures

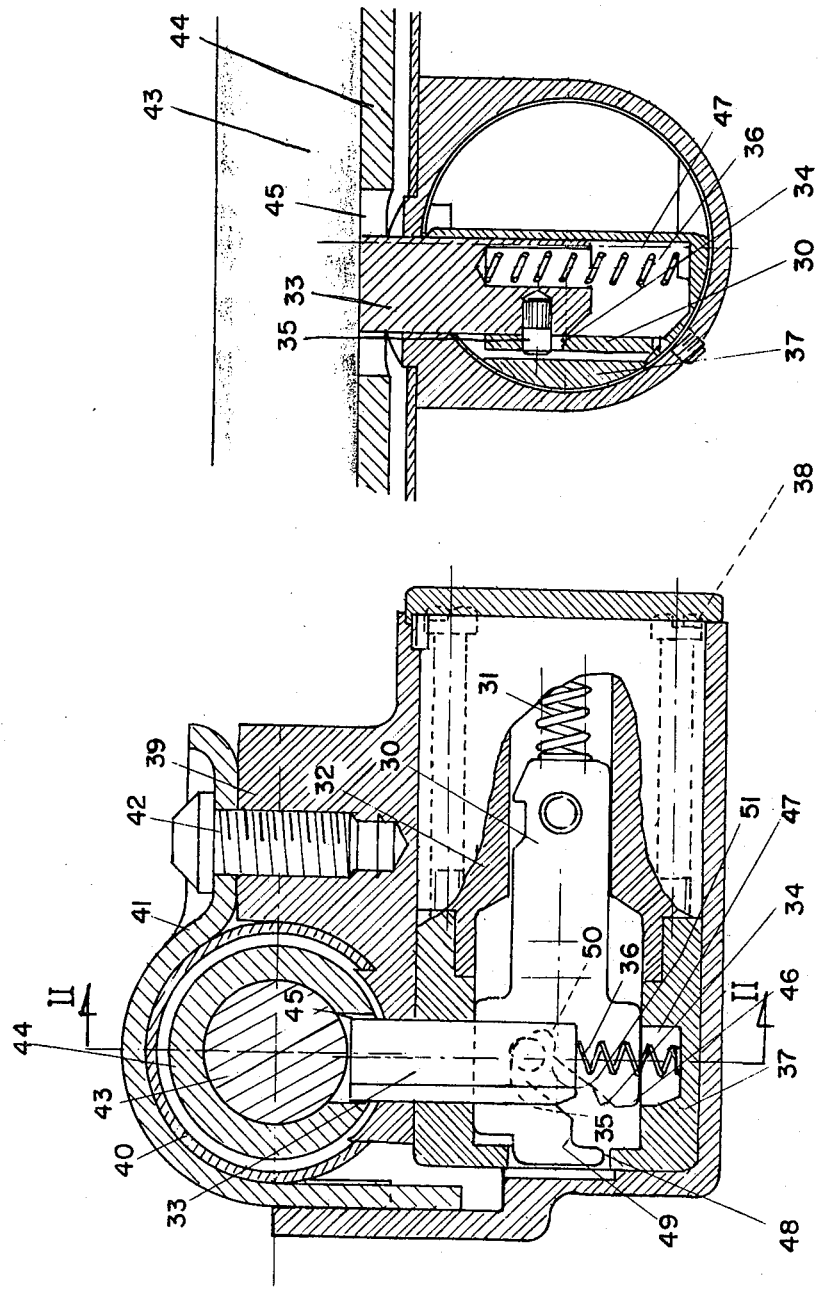

KEY OPERATED LOCK FOR SECURING A MOVABLE PORTION OF A MOTOR VEHICLE

BACKGROUND TO THE INVENTION

The present invention relates to improvements to an anti-theft device to facilitate the installation of the device in a motor vehicle and to simplify its assembly.

The anti-theft device disclosed in the published United Kingdom patent specification No. 2061370A, provides for an extremely simple assembly of the bolt and its actuator, i.e. the bolt slide. After they have been assembled, however, the operation of mounting the anti-theft device on the steering column is a relatively complicated one.

SUMMARY OF THE INVENTION

According to the invention there is provided an anti-theft device for a motor vehicle comprising:
(a) a housing,
(b) means for securing and housing to a relatively fixed part of the vehicle,
(c) a locking bolt movable along a first axis between a locking position where said bolt engages an aperture in a movable portion of the vehicle to be locked and an unlocked position,
(d) a driving pin extending from said locking bolt,
(e) a driving plate slidable along a second axis transverse to said first axis, said driving plate having a slot receiving said driving pin, which slot includes
  (i) a first portion inclined to said first axis,
  (ii) a second portion contiguous with one end of said first portion extending generally transversely of said first axis, and
  (iii) a third portion contiguous with the other end of the said first portion extending parallel to said first axis,
(f) a cylinder lock rotatable by means of a key within a bore in the housing for effecting movement of said bolt between locking and unlocking positions,
(g) a cam fixed to said cylinder lock so as to be rotatable thereby said cam being in driving engagement with said driving plate, whereby on rotation of said cylinder lock the cam effects movement of said driving plate which in turn by way of the first portion of the slot causes said locking bolt to be driven into its locking position and,
(h) a return spring for urging said driving plate in opposition to its displacement by the cam wherein, due to the second portion of the slot no withdrawal of the locking position is possible and due to the third portion of the slot movement of said bolt into a fully retracted position without movement of said driving plate for the purpose of assembly of the cylinder is possible.

The anti-theft device can be assembled, by a simple insertion movement of the cylinder lock parallel to the axis of the lock, in the housing fixed to the steering column.

The operation of causing the bolt to move out of the way can be affected mechanically, by rotating the lock into a special assembling position. This movement can also be effected manually by the assembly mechanic.

BRIEF DESCRIPTION OF DRAWINGS

The invention will now be described with reference to the accompanying drawings, in which:

FIG. 1 is a schematic sectional diagram, partly in elevation of an anti-theft device in accordance with one embodiment of the invention, mounted on the steering column of a vehicle and occupying the locking position, FIG. 2 is a section along the line II—II of FIG. 1.

DESCRIPTION OF PREFERRED EMBODIMENT

Figure 4:
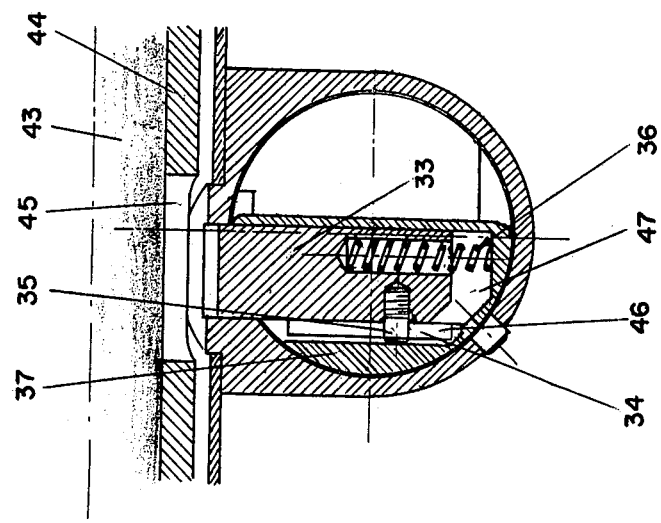
FIG. 4 is a sectional view along the line IV—IV of FIG. 3.
Figure 3:
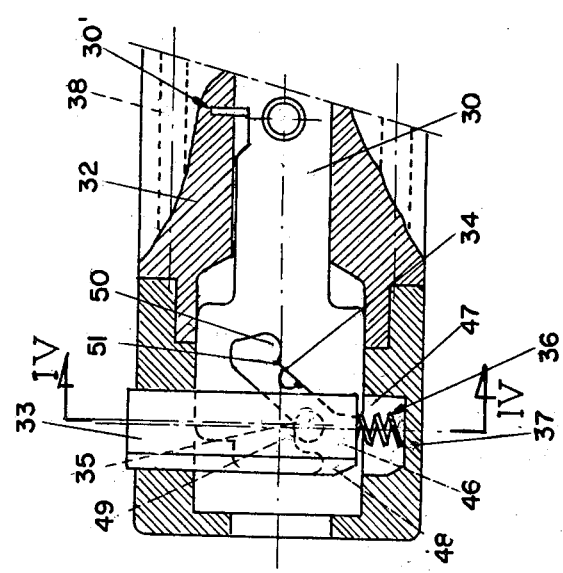
FIG. 3 is a partial view on the same lines as that provided by FIG. 1, the anti-theft device in this case occupying the unlocking position.
Figure 5:
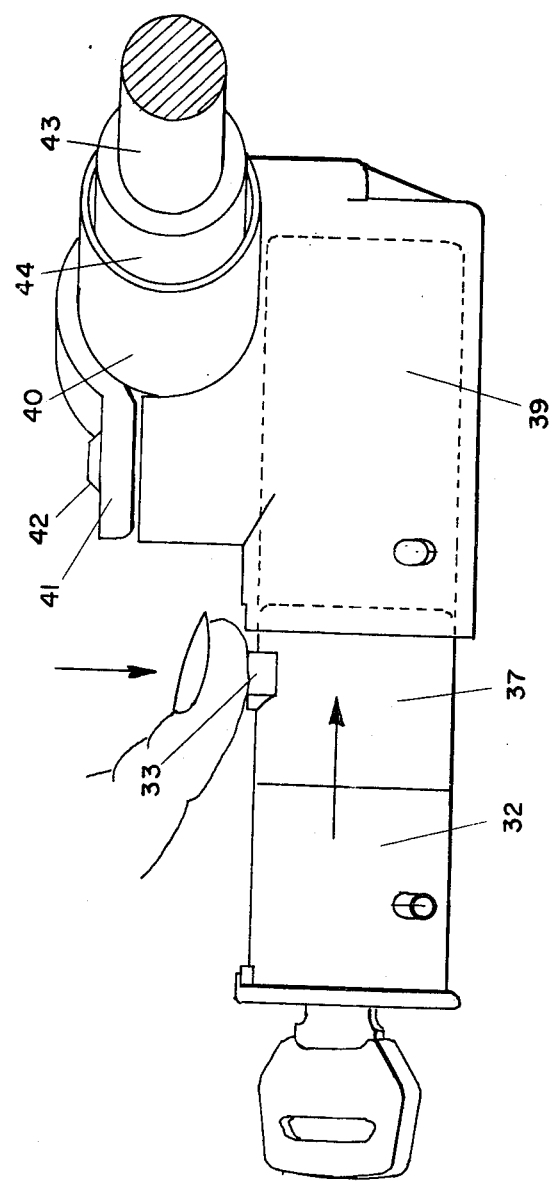
FIG. 5 is a schematic view in perspective and partly in section, illustrating the assembly of the anti-theft device shown in FIGS. 1 to 4.

The anti-theft device described in FIGS. 1 to 5 comprises a driving plate 30 caused to perform a traversing movement by a lock barrel (not shown) via a cam and subjected to the action of a restoring spring 31. The slide 30 slides in the body 32 of the lock. The driving plate 30 actuates the bolt 33 via an inclined cut-away slot 34, in which a pin 35, fixed to the bolt 33, performs a sliding movement. The bolt 33, subjected to the action of a spring 36 which returns it to the locking position (FIG. 1), is guided in a bolt guide device 37. The bolt guide device 37 is secured to the body 32 of the lock by screws 38 which cannot be unscrewed or by detachable-head screws.

The assembly described in the foregoing and constituting a complete anti-theft system is mounted in a support 39 itself fixed to the steering column 40 by a steel collar 41 and detachable-head screws 42. A ring 44 provided with a slit 45 is affixed to the steering shaft 43. In the locking position the bolt 33 penetrates the slit 45 and locks the steering shaft 43.

The inclinded slot 34 terminates at the bottom (as seen in the drawing) with an end portion 46 extending parallel to the axis of the locking bolt 33. The bolt guide device 37 is provided with a hollow portion 47 into which the end of the bolt 33 can enter. In the unlocking position (FIGS. 3, 4 and 5) the bolt can be pushed back by the assembly mechanic with his finger (FIG. 5), since the pin 35 can pass along the end portion 46, thus completely entering the bolt guide device 37, after which the body 32 and guide device 37 can be introduced into the body 39 by a simple insertion movement. During this manipulation of the bolt 33, its end adjacent to the spring 36 penetrates The portion 46 of the inclined slot 34 terminates with a nose 48 extending parallel to the locking bolt slide 33. This nose 48 enables the bolt guide device 37 to be held securely to the bolt body 32, the bolt 33 being inserted into the hollow portion 47 by hand, thus enabling the pin 35 to enter the portion 48. Once this assembly operation has been completed, the bolt 33 is released and is caused by the action of its spring 36 to assume the unlocking position (FIG. 3), the pin 35 butting against the shoulder 49 provided inboard of the portion 46 of the slot 34. During this assembly operation the driving plate 30 is secured in the unlocking position by a tongue 30' actuated by the lock.

At its end opposite to the portion 46 the inclined slot 34 possesses a cut-away portion 50 extending substantially parallel to the bolt 33 and providing a projecting stop 51. When the bolt 33 occupies the locking position (FIGS. 1 and 2) and an attempt is made (by a thief) to push it into its unlocking position, the pin 35 comes to rest at the base of the cut-away portion 50, thus preventing the bolt from entering the said unlocking position.

I claim:

1. An anti-theft device for a motor vehicle comprising:
   (a) a housing,
   (b) means for securing said housing to a relatively fixed part of the vehicle,
   (c) a locking bolt movable along a first axis between a locking position where said bolt engages an aperture in a movable portion of the vehicle to be locked and an unlocked position,
   (d) a driving pin extending from said locking bolt,
   (e) a driving plate slidable along a second axis transverse to said first axis, said driving plate having a slot receiving said driving pin, which slot includes
      (i) a first portion inclined to said first axis,
      (ii) a second portion contiguous with one end of said first portion extending generally transversely of said first axis, and
      (iii) a third portion contiguous with the other end of said first portion extending parallel to said first axis,
   (f) a cylinder lock rotatable by means of a key within a bore in the housing for effecting movement of said bolt between locking and unlocking positions,
   (g) a cam fixed to said cylinder lock so as to be rotatable thereby, said cam being in driving engagement with said driving plate, whereby on rotation of said cylinder lock the cam effects movement of said driving plate which in turn by way of the first portion of the slot causes said locking bolt to be driven into its locking position, and
   (h) a return spring for urging said driving plate in opposition to its displacement by the cam wherein, due to the second portion of the slot no withdrawal of the locking bolt from its locking position is possible and due to the third portion of the slot movement of said bolt into a fully retracted position without movement of said driving plate for the purpose of assembly of the cylinder is possible.

2. An anti-theft device according to claim 1, wherein said third portion of the slot is so dimensioned in the direction of said second axis to permit movement of said driving plate over a portion of its path without movement of said locking bolt.

* * * * *